US010274682B2

(12) United States Patent
Frankel et al.

(10) Patent No.: US 10,274,682 B2
(45) Date of Patent: Apr. 30, 2019

(54) METHOD AND SYSTEM FOR PROVIDING OPTICAL CONNECTIONS

(71) Applicant: Ciena Corporation, Hanover, MD (US)

(72) Inventors: Michael Y. Frankel, Baltimore, MD (US); John P. Mateosky, West River, MD (US); Vladimir Pelekhaty, Hanover, MD (US)

(73) Assignee: Ciena Corporation, Hanover, MD (US)

( * ) Notice: Subject to any disclaimer, the term of this patent is extended or adjusted under 35 U.S.C. 154(b) by 70 days.

(21) Appl. No.: 15/439,748

(22) Filed: Feb. 22, 2017

(65) Prior Publication Data

US 2017/0160482 A1 Jun. 8, 2017

Related U.S. Application Data

(63) Continuation of application No. 14/625,400, filed on Feb. 18, 2015, now Pat. No. 9,612,401.

(51) Int. Cl.
| | | |
|---|---|---|
| *G02B 6/14* | (2006.01) | |
| *G02B 6/30* | (2006.01) | |
| *G02B 6/34* | (2006.01) | |
| *G02B 6/42* | (2006.01) | |
| *G02B 6/124* | (2006.01) | |
| *G02B 6/126* | (2006.01) | |
| *G02B 6/43* | (2006.01) | |

(52) U.S. Cl.
CPC ............ *G02B 6/305* (2013.01); *G02B 6/124* (2013.01); *G02B 6/126* (2013.01); *G02B 6/14* (2013.01); *G02B 6/30* (2013.01); *G02B 6/34* (2013.01); *G02B 6/4206* (2013.01); *G02B 6/4214* (2013.01); *G02B 6/43* (2013.01)

(58) Field of Classification Search
CPC .......... G02B 6/124; G02B 6/126; G02B 6/14; G02B 6/30; G02B 6/305; G02B 6/34; G02B 6/4206; G02B 6/4214; G02B 6/43
USPC .......... 385/14, 37, 49, 51–52, 129, 131, 132
See application file for complete search history.

(56) References Cited

U.S. PATENT DOCUMENTS

| 5,568,574 A | 10/1996 | Tanguay, Jr. et al. |
| 8,280,207 B2 | 10/2012 | Pinguet et al. |
| (Continued) | | |

FOREIGN PATENT DOCUMENTS

| EP | 2386891 A1 | 11/2011 |
| JP | 2004170716 A | 6/2004 |
| (Continued) | | |

OTHER PUBLICATIONS

Bradley Snyder et al; IEEE Transactions on Components, Packaging and Manufacturing Technology, vol. 3, No. 6, Jun. 2013 (6 pages).

(Continued)

*Primary Examiner* — Michael P Mooney
(74) *Attorney, Agent, or Firm* — Clements Bernard Walker PLLC; Christopher L. Bernard; Lawrence A. Baratta, Jr.

(57) ABSTRACT

A system for providing optical connections that may include an optical grating structure and an optical waveguide coupled to the optical grating structure. The optical grating structure may be configured to receive an optical wave, through an interposer, from an optical source. The optical grating structure may be configured to transform the optical wave into a predetermined electromagnetic propagation mode.

20 Claims, 4 Drawing Sheets

(56) References Cited

U.S. PATENT DOCUMENTS

| | | | |
|---|---|---|---|
| 9,746,608 B1* | 8/2017 | Rabiei | G02B 6/124 |
| 2006/0239612 A1* | 10/2006 | De Dobbelaere | G02B 6/42 |
| | | | 385/37 |
| 2009/0003762 A1 | 1/2009 | Chiniwalla et al. | |
| 2013/0209026 A1 | 8/2013 | Doany et al. | |
| 2013/0279844 A1 | 10/2013 | Na et al. | |
| 2014/0270642 A1 | 9/2014 | Frish | |
| 2014/0294342 A1 | 10/2014 | Offrein et al. | |
| 2014/0355931 A1 | 12/2014 | Tummala et al. | |
| 2017/0207600 A1 | 7/2017 | Klamkin et al. | |

FOREIGN PATENT DOCUMENTS

| | | |
|---|---|---|
| WO | 2013089755 A1 | 6/2013 |
| WO | 2015/012213 A1 | 1/2015 |
| WO | 2016011002 A1 | 1/2016 |

OTHER PUBLICATIONS

Navin Prakash Ghimire; "Focusing grating coupler for spectrally encoded optical coherence tomography" Universiteit Gent, Jun. 1, 2009 (74 pages).

Hongqiang Li et al; "Large-Area Binary Blazed Grating Coupler between Nanophotonic Waveguide and LED" Hindawi Jublishing Corporation, The Scientific World Journal, vol. 2014, Article ID 586517, Published Jul. 13, 2014 (6 pages).

Extended European Search Report issued in corresponding European application No. 16156176.6-1553 dated Jul. 11, 2016 (9 pages).

Antelius, M., et al., "An apodized SOI waveguide-to-fiber surface grating coupler for single lithography silicon photonics", Optical Society of America, 2011 (7 pages).

Summons to attend oral proceedings and annex to the communication issued in corresponding European Application No. 16156176.6, dated Jan. 4, 2018 (13 pages).

* cited by examiner

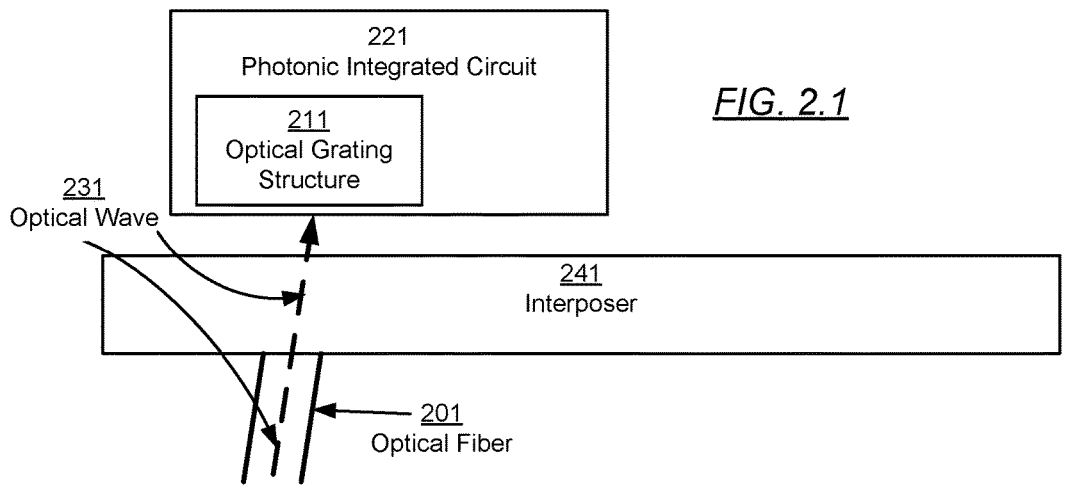
FIG. 2.1
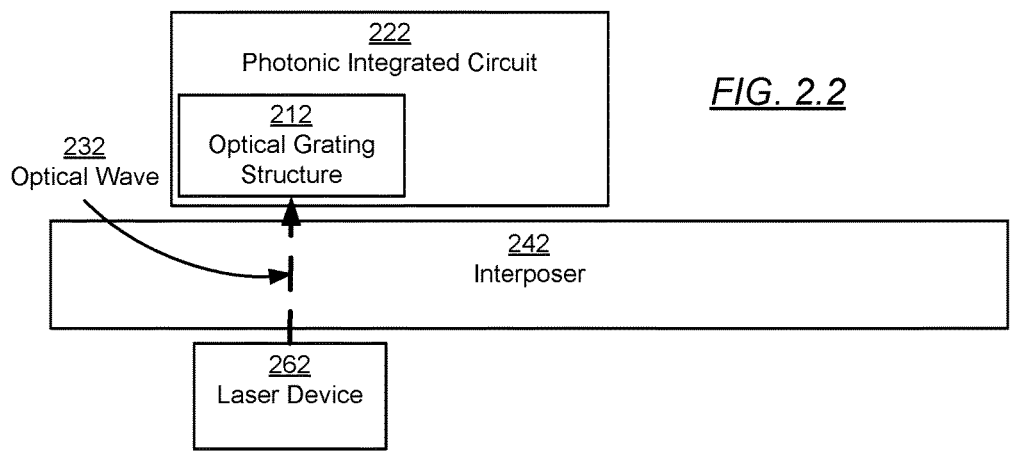
FIG. 2.2
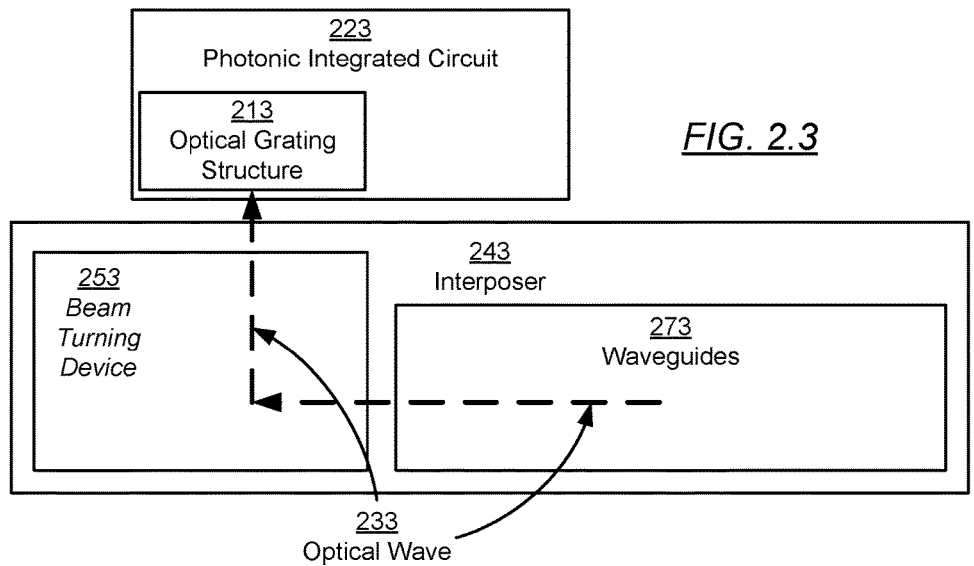
FIG. 2.3

METHOD AND SYSTEM FOR PROVIDING OPTICAL CONNECTIONS

CROSS REFERENCE TO RELATED APPLICATIONS

This application is a continuation of and claims benefit under 35 U.S.C. § 120 to U.S. application Ser. No. 14/625,400, filed Feb. 18, 2015, which is incorporated herein by reference in its entirety.

BACKGROUND

Photonic integrated circuits (PICs) are devices that may perform various optical functions similar to an electronic integrated circuit. PICs may be integrated with electronic integrated circuits into a single chip or into a multi-chip module.

SUMMARY

In general, in one aspect, embodiments relate to an apparatus for providing optical connections including an integrated circuit. The integrated circuit may include an optical grating structure and an optical waveguide coupled to the optical grating structure. The apparatus may further include an interposer coupled to the integrated circuit. The interposer may be configured for transmission, through the interposer, of an optical wave to the optical grating structure or from the optical grating structure. The optical grating structure may be configured to transform the optical wave into a predetermined electromagnetic propagation mode.

In general, in one aspect, embodiments relate to a system for providing optical connections including an optical grating structure and an optical waveguide coupled to the optical grating structure. The optical grating structure may be configured to receive an optical wave, through an interposer, from an optical source. The optical grating structure may be configured to transform the optical wave into a predetermined electromagnetic propagation mode.

In general, in one aspect, embodiments relate to a method for manufacturing an electro-optical system for providing optical connections. The method may include providing a first substrate. The method may further include forming an optical waveguide disposed on the first substrate. The method may further include forming an optical grating structure disposed on the first substrate. The optical grating structure may be configured to transform an optical wave into a predetermined electromagnetic propagation mode inside the optical waveguide. The method may further include providing a second substrate. The second substrate may be configured for a transmission, through the second substrate, of the optical wave to the optical grating structure or from the optical grating structure. The method may further include bonding the second substrate to the first substrate.

Other aspects of the invention will be apparent from the following description and the appended claims.

BRIEF DESCRIPTION OF DRAWINGS

FIG. 2.1, FIG. 2.2, and FIG. 2.3 show systems in accordance with one or more embodiments.

DETAILED DESCRIPTION

Figure 1:
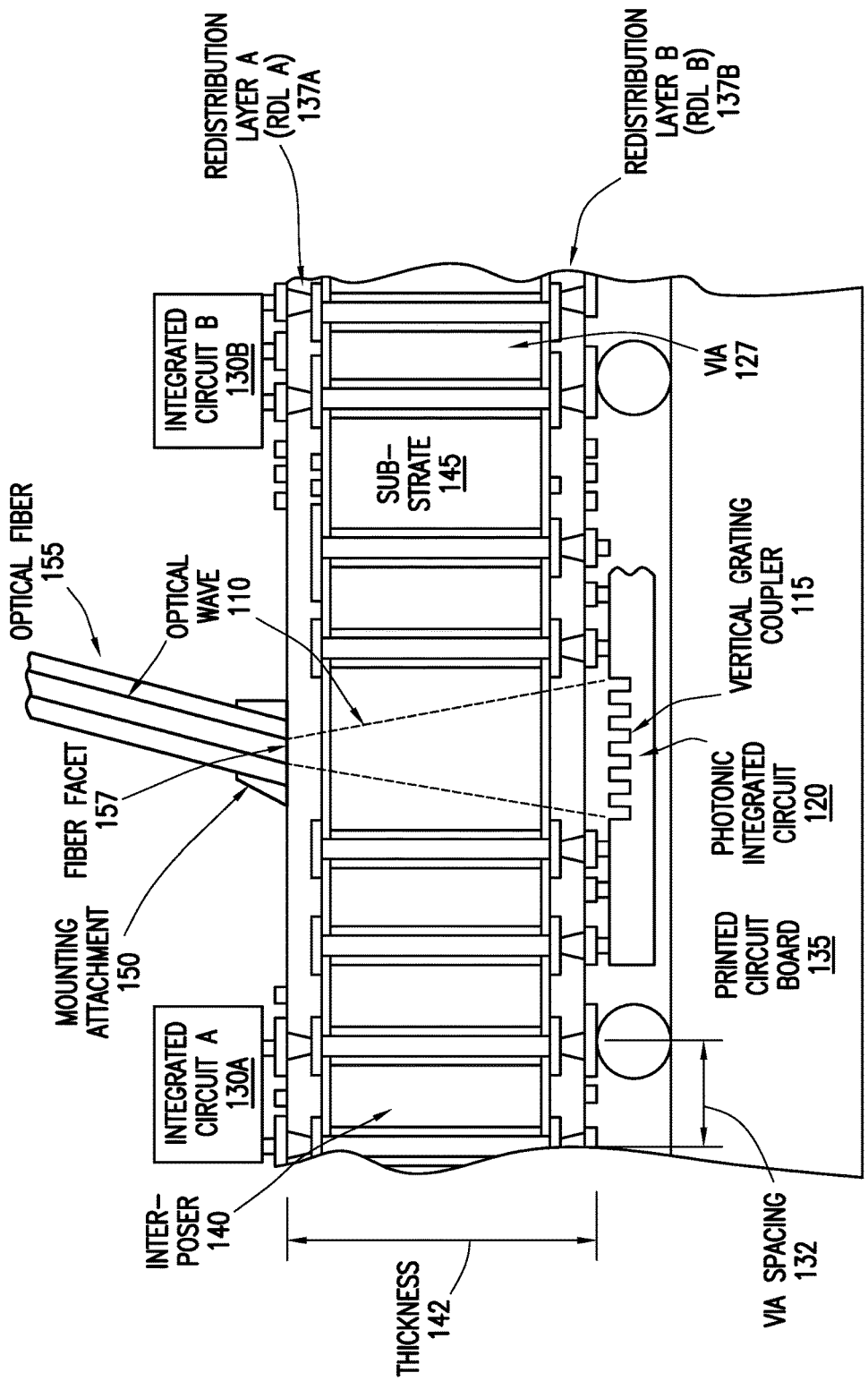
FIG. 1 shows a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include an apparatus, a system, and a method for manufacturing an electro-optical system for providing optical connections. The electro-optical system may include an optically-transparent interposer for transmitting light received from an optical source to an optical grating structure, such as a vertical grating coupler, disposed on a photonic integrated circuit. The optically-transparent interposer may also be configured for transmitting light received from the optical grating structure to an optical receiver. Specifically, an optical fiber may be the optical source or the optical receiver in the electro-optical system.

FIG. 1 shows a cross-section view of an electro-optical system in accordance with one or more embodiments. In one or more embodiments, an electro-optical system as shown in FIG. 1 includes a printed circuit board (e.g., printed circuit board (135)), a photonic integrated circuit (e.g., photonic integrated circuit (120)), an interposer (e.g., interposer (140)) and an optical fiber (e.g., optical fiber (155)). The interposer may be a physical interface configured for providing electrical or optical connections between various electrical or optical components. In the electro-optical system of FIG. 1, an optical wave (e.g., optical wave (110)) may travel from the optical fiber (155), through the interposer (140), and to the photonic integrated circuit (120). The electro-optical system may be a system-on-chip (SoC) device that includes various components for processing optical waves, radio frequency (RF) signals or other analog signals, as well as performing digital signaling processing, computer-processing, and/or other functionality with respect to the electro-optical system. In particular, the various components may be disposed on a particular die in a deep-submicron process.

In one or more embodiments, the photonic integrated circuit (120) interacts with a vertical grating coupler (e.g., vertical grating coupler (115)). The vertical grating coupler (115) may be an optical grating structure disposed on the photonic integrated circuit (120), and configured to receive the optical wave (110) at a substantially vertical orientation. For example, in an embodiment, the vertical grating coupler (115) may be configured to receive the optical wave (110) from a fiber with a 7 degree tilt. In one or more embodiments, the vertical grating coupler (115) may transform the optical wave (110) into a particular electromagnetic propagation mode, such as a transverse magnetic mode (TM) mode, a transverse electric (TE) mode, or another mode for propagating an optical wave through a waveguide inside the photonic integrated circuit (120). In one or more embodiments, instead of being operatively connected to the optical fiber (155) the vertical grating coupler (115) is operatively connected to a discrete photo-detector, an array of optical detectors, a laser diode, a laser cavity, or a laser array.

In one or more embodiments, the interposer (140) may include a substrate (145) and various electrical redistribution layers (RDL) (e.g., RDL A (137A) and RDL B (137B)). An electrical redistribution layer may include metallic conductive traces disposed on the substrate (145) and provide bond pads to one or more electronics devices. Specifically, RDL A (137A) may be coupled to one or more integrated circuits (e.g., an integrated circuit A (130A) and an integrated circuit B (130B)). The interposer (140) may span a thickness (142) with one or more vias (e.g., via (127)) passing through the substrate (145). The various vias may have a particular via spacing (e.g., via spacing (132)) and provide various electrical connections to various devices on the other side of the interposer (140), (e.g., the photonic integrated circuit (120) coupled to RDL B (137B)). The vias (127) may include through-panel vias (TPVs), such as a through-silicon via (TSV) or a through-glass via (TGVs), depending on the substrate (145).

In one or more embodiments, the interposer (140) may couple with the printed circuit board (135) using flip chip bonding. Flip chip bonding, also known as controlled collapse chip connection or C4, may include the process of interconnecting semiconductor devices using solder bumps deposited onto chip pads. For example, flip chip solder bumps may be bonded to bare die to enable wafer-scale processing of multiple die on the substrate (145) or the interposer (140). As such, flip chip bonding may provide a direct and low-parasitic electrical connection for electrical traces throughout the interposer (140).

In one or more embodiments, the optical fiber (155) may be coupled to the interposer (140). The optical fiber (155) may include a core configured for transmitting various optical waves (e.g., optical wave (110)) through a fiber facet (157). The core may be surrounded by a cladding and one or more jackets or other members. Further, the optical fiber (155) may be attached to the substrate (145) or to the RDL (A) (137A) using a mounting attachment (150). The mounting attachment (150) may be a coupling device, such as a glass mounting block, that is fixed to the interposer (140) through an adhesive (e.g., glue) or other applicable method. As such, the mounting attachment (150) may provide a horizontal or planar mount of the core and cladding of the optical fiber (155) onto the top-side of the interposer (140) using a passive v-groove alignment to sub-micron tolerances. The mounting attachment (150) may dispose the fiber facet (157) as to provide an optical wave column to be aligned for projection by way of a 90 degree corner turn onto the vertical grating coupler (115) with a v-groove center-line placement and etched depth.

In one or more embodiments, the optical wave (110) travels along a path from the vertical grating coupler (115), through the interposer (140), and to the optical fiber (155). As such, the electro-optical system may be bidirectional in regard to the direction that optical waves travel within the electro-optical system. Specifically, in an electro-optical system, various optical waves may travel from an optical source, such as the optical fiber (155) or an optical transmitter that includes a laser device, such as a laser diode, a laser cavity, or a laser array, into the photonic integrated circuit (120), while the same or a different electro-optical system may have various optical waves travel out of the photonic integrated circuit (120) to an optical receiver (e.g., to a different optical fiber). In one or more embodiments, the electro-optical system includes optical waves propagating in opposite directions within the electro-optical system (e.g., one optical wave traveling from the vertical grating coupler (115) to the optical fiber (155), and a different optical wave traveling from the optical fiber (155) to the vertical grating coupler (115)).

In one or more embodiments, the interposer (140) is configured to be optically-transparent. Specifically, the substrate (145), the RDL A (137A), and the RDL B (137B) may be composed of optically-transparent media that enable the optical wave (110) to pass through the interposer (140) on an approximately unobstructed path, with little scattering of the optical wave (110). For example, the optically-transparent media may be glass, or a similar material having transparency in one or more optical wavelength bands used by the electro-optical system. As such, an optically-transparent interposer may provide for beam expansion by the optical wave (110), within the optically-transparent interposer, such that the optical wave (110) may be intercepted by the vertical grating coupler (115) on top of the die for the photonic integrated circuit (120). In one or more embodiments, an optically-transparent interposer is configured to produce an approximately straight path for a particular optical wave between an optical source and an optical grating structure. In one or more embodiments, one or more regions in an electrical redistribution layer in an optically-transparent interposer are removed during the formation process to provide the approximately straight path through the optically-transparent interposer.

In one or more embodiments, the interposer (140) provides a spatial separation between an optical source or an optical receiver (e.g., the optical fiber (155)) and the vertical grating coupler (115). Specifically, the spatial separation may include the thickness (142) of the interposer (140), which may be approximately 100 μm to 300 μm in length. Using an exemplary Gaussian beam profile for an optical wave having a wavelength of 1550 nm, a beam radius r(Z) emanating from an aperture of an optical source (e.g., the fiber facet (157)) may increase as the corresponding optical wave moves away from the aperture. As such, the beam radius r(Z) may be expressed by the following equation:

$$r(Z) = r_o \sqrt{1 + \left(\frac{Z}{Z_R}\right)^2} \quad \text{Equation 1}$$

Where Z is distance from the aperture, $r_o$ is the beam radius at the fiber facet, and $Z_R$ is the Rayleigh distance. The Rayleigh distance may be expressed by the following equation:

$$Z_R = \frac{\pi \cdot n}{\lambda_o} r_o^2 \quad \text{Equation 2}$$

where n is the index of refraction in the free space expansion region (e.g., the optically-transparent space inside the interposer (140)), and $\lambda_o$ is wavelength of the optical wave (110) in a vacuum. For example, if the index of refraction n is for silicon (e.g., n=3.478), the beam radius may be less than 10 μm for a 300 μm distance between the fiber facet (157) and the vertical grating coupler (115). Furthermore, if the index of refraction n is for glass (e.g., n=1.47), the beam radius may be less than 20 μm for a 300 μm distance between the fiber facet (157) and the vertical grating coupler (115). As such, increasing the spatial separation between the optical source and the vertical grating coupler (115) may produce a larger beam radius for the optical wave (110). The wave front may transition from planar to an approximately spherical shape beyond 30 μm spatial separation distance in glass.

In one or more embodiments, the vertical grating coupler (115) is configured to intercept the optical wave (110) and focus the optical wave (110) into a waveguide disposed on the photonic integrated circuit (120). Specifically, the vertical grating coupler (115) may be used to match a focused spot to an approximately Gaussian spatial field distribution of the electromagnetic propagation mode used in the optical fiber (155). For example, the vertical grating coupler (115) may be configured to receive a particular type of input wave, such as an optical wave with a spherically-shaped wave front, exiting the interposer (140). As such, the vertical grating coupler (115) may transform the received input wave into a planar waveform inside the photonic integrated circuit (120), e.g., for inserting the received input wave into a waveguide.

In one or more embodiments, the vertical grating coupler (115) includes various diffraction gratings. A diffraction grating may include various diffraction grooves disposed on the vertical grating coupler (115) and correspond to a predefined grating period between sequential grooves. As such, the grating period may describe the distance between the sequential grooves as repeated throughout a particular diffraction grating. In one or more embodiments, the diffraction grooves may be configured to receive a spherically-shaped input wave front at a substantially vertical orientation.

In one or more embodiments, the grating period may be configured based on the angle of diffraction of one or more optical waves transmitted by an optical source (e.g., the optical fiber (155)). For example, an angle of diffraction may change with the wavelength of a respective optical wave. Specifically, optical waves imaged from the vertical grating coupler (115) onto an optical source (e.g., light transmitted out of the fiber facet (157)) may experience a relative offset based on wavelength deviation Δλ between different optical waves. As such, the relative offset may produce a misalignment between the optical modes of the optical source and the vertical grating coupler (115). As such, the misalignment may be as a function of the wavelength deviation from the center of a nominal image (i.e., a location of an image on the optical source imaged from the vertical grating coupler (115) if no wavelength deviation occurred). Furthermore, the misalignment may increase insertion loss of optical waves into the photonic integrated circuit (120). In one or more embodiments, the misalignment may be analyzed by computing the coupling efficiency η between an optical source and the vertical grating coupler (115). For example, the coupling efficiency η may be expressed by the following equation:

$$\eta = \frac{4r_1^2 r_2^2}{(r_1^2 + r_2^2)^2} e^{\left(\frac{-2\Delta x^2}{r_1^2 + r_2^2}\right)} \qquad \text{Equation 3}$$

where $r_1$ and $r_2$ are mode radii for two different Gaussian modes, and Δx is the relative offset of the focal spot. For example, based on a maximum 1 dB excess coupling loss with approximately matched modes (e.g., $r_1=r_2$), a maximum tolerable misalignment may correspond to a 48% relative offset, or a relative offset Δx that is approximately 2.5 μm for a 5.25 μm radius mode of a single mode optical fiber. Specifically, the relative offset may be a function of the wavelength 2i of a particular optical wave, an interposer's thickness W, and the refractive index of interposer's optically-transparent substrate $n_g$. In one or more embodiments, the relative offset Δx is expressed using the following equation:

$$\Delta x = \frac{W}{\Lambda n_g} \Delta \lambda \qquad \text{Equation 4}$$

The wavelength deviation Δλ may be expressed using the following equation:

$$\Delta \lambda = \frac{\Delta x n_g}{W} \Lambda \qquad \text{Equation 5}$$

As such, the interposer (140) may be configured with the vertical grating coupler (115) to generate a predetermined spectral bandwidth for an electro-optical system based on the predicted wavelength deviation and the relative offsets of various optical waves. For example, in a particular electro-optical system, an interposer with an approximate 100 μm substrate thickness with a wavelength deviation of Δλ=44.8 nm may produce an expected 1 dB excess loss and a spectral bandwidth twice the wavelength deviation (e.g., 2× Δλ). In another example, with an approximate 200 μm substrate thickness in an electro-optical system with a wavelength deviation of Δλ=22.4 nm may produce an expected 1 dB excess loss and a spectral bandwidth twice the wavelength deviation.

In one or more embodiments, the grating period Λ is expressed using the following equation:

$$\Lambda = \frac{\lambda}{n_{\textit{eff}} - n_g \sin\theta} \qquad \text{Equation 6}$$

where λ is the wavelength of a particular optical wave, θ is the diffraction angle of the particular optical wave, $n_g$ is the refractive index of interposer's optically-transparent substrate, and $n_{\textit{eff}}$ is the effective refractive index in the waveguiding region of the vertical grating coupler (115). As such, the diffraction angle θ may be expressed by the following equation:

$$\sin\theta = \frac{n_{\textit{eff}}}{n_g} - \frac{\lambda}{n_g \Lambda} \qquad \text{Equation 7}$$

Example values for Equation 7 may include $\Lambda=609$ nm, $\lambda=1550$ nm, $n_g=1.47$, and $n_{eff}=2.8$.

FIGS. 2.1, 2.2, and 2.3 show various electro-optical systems in accordance with one or more embodiments. Turning to FIG. 2.1, the electro-optical system in FIG. 2.1 may include a photonic integrated circuit (221), an optical grating structure (211) (e.g., a vertical grating coupler), an interposer (241), and an optical fiber (201). An optical wave (231) may pass from the optical fiber (201) and through the interposer (241), thereby arriving at the optical structure (211) in the photonic integrated circuit (221).

Turning to FIG. 2.2, the electro-optical system in FIG. 2.2 may include a photonic integrated circuit (222), an optical grating structure (212) (e.g., a vertical grating coupler), an interposer (242), and a laser device (262). The laser device (262) may be a vertical-cavity surface-emitting laser (VCSEL) or another type of laser configured for generating a vertical beam emission into the interposer (242). As such, the laser device (262) may emit an optical wave (232) that may pass into the interposer (242) and to the optical structure (212) in the photonic integrated circuit (222). In one or more embodiments, the laser device is mounted on the interposer (242).

Turning to FIG. 2.3, the electro-optical system in FIG. 2.3 may include a photonic integrated circuit (223), an optical grating structure (213) (e.g., a vertical grating coupler), and an interposer (243). In one or more embodiments, the interposer (243) includes various waveguides (273) for directing an optical wave (233) to a beam turning device (253) inside the interposer (243). For example, the beam turning device (253) may include a turning mirror (e.g., a component with a coated surface with an incline of 45 degrees may turn an incident beam of an optical wave 90 degrees into the optical grating structure (213)) or another type of reflective surface. Specifically, the waveguides (273) may include various reflective structures for directing the optical wave (233) throughout the interposer (243). For example, the waveguides (273) may include a resonant cavity with an embedded gain element for transmitting the optical wave (233), e.g., a distributed feedback (DFB) laser. A distributed feedback laser may include a gain section waveguide surrounded by one or more Bragg grating-based distributed feedback elements and/or mirror reflectors. By using multiple reflections, the distributed feedback laser may produce a resonant cavity that supports laser action when combined with light amplification within the gain section. At the beam turning device (253), the optical wave (233) may be directed to the optical structure (213) in the photonic integrated circuit (223) at a substantially vertical orientation.

Figure 3:
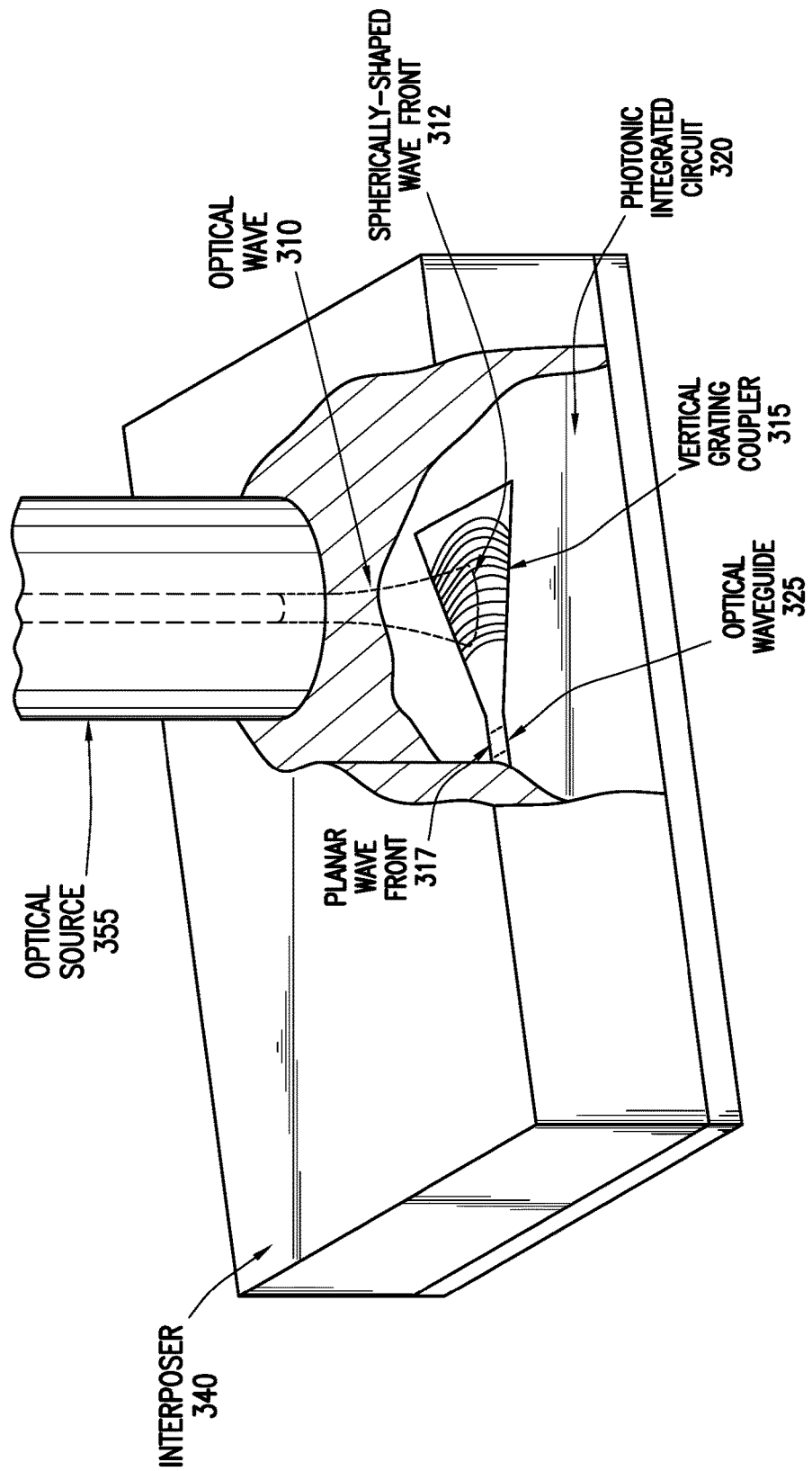
FIG. 3 shows an example in accordance with one or more embodiments.

FIG. 3 provides an example of an electro-optical system. The following example is for explanatory purposes only and not intended to limit the scope of the invention.

In FIG. 3, an electro-optical system is shown that includes a photonic integrated circuit (320) and an optical source (355) attached to an interposer (340). The optical source (355) transmits an optical wave (310) into the interposer (340). The optical wave (310) diverges into a spherically-shaped wave front (312) before impinging on a vertical grating coupler (315) on the photonic integrated circuit (320). The vertical grating coupler (315) transforms the optical wave (310) to have a planar wave front (317) inside an optical waveguide (325).

Figure 4:
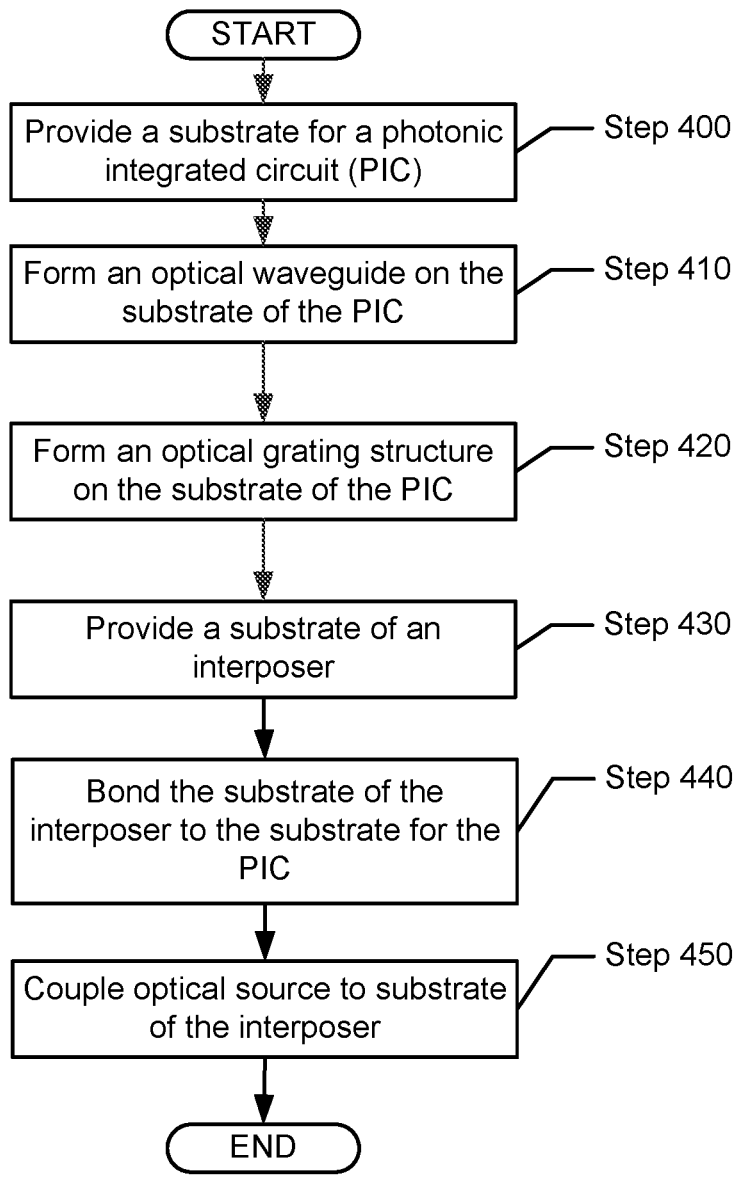
FIG. 4 shows a flowchart in accordance with one or more embodiments.

FIG. 4 shows a flowchart in accordance with one or more embodiments. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 4 shows a method for manufacturing an electro-optical system for providing optical connections in accordance with one or more embodiments. In Step 400, a substrate is provided for fabricating a photonic integrated circuit in accordance with one or more embodiments. The substrate may be a silicon-on-insulator (SoI) wafer or any other applicable wafer-type.

In Step 410, an optical waveguide is formed on the substrate of the photonic integrated circuit in accordance with one or more embodiments. For example, a thin film layer may be deposited on the substrate for the photonic integrated circuit. The thin film layer may be etched into the optical waveguide using chemically assisted plasma or a wet chemical microfabrication process.

In Step 420, an optical grating structure is formed on the substrate of the photonic integrated circuit in accordance with one or more embodiments. The optical grating structure may be an optical grating structure as described in FIGS. 2.1, 2.2, and 2.3. Furthermore, the optical grating structure may be etched using various lithographic, micro-fabrication techniques. In one or more embodiments, the optical grating structure may be a vertical grating coupler as described in FIG. 1. The optical grating structure may include a diffraction grating with a particular grating period in order to receive a spherically-shaped input waveform of an optical wave. The optical grating structure may also be disposed on the same thin film layer used in etching the optical waveguide in Step 410.

In Step 430, a substrate is provided for an interposer in accordance with one or more embodiments. The substrate may be an optically-transparent substrate as described with respect to FIG. 1. The substrate of the interposer may be a glass wafer, panel, from a roll-to-roll process, and silicon wafer. As such, the substrate of the interposer may provide light transparency with low loss in the wavelength regimes of interest, e.g., 1200 nm-1700 nm One or more electrical redistribution layers may be deposited on the substrate of the interposer. Various electronics components may also be attached to the substrate of the interposer.

In Step 440, the substrate of the interposer is attached to the substrate of the photonic integrated circuit in accordance with one or more embodiments. In one or more embodiments, flip chip bonding is used to attach the two substrates. For more information regarding flip chip bonding, see FIG. 1 and the accompanying description. In one or more embodiments, the fabrication of an electro-optical system in Steps 400-440 provides for on-wafer testing prior to die singulation.

In Step 450, an optical source is coupled to the substrate of the interposer in accordance with one or more embodiments. For instance, the optical source may be an optical fiber. As such, an optical fiber may be connected to the mounting attachment, and the mounting attachment may be connected with an adhesive to the substrate of the interposer. Specifically, coupling the optical fiber may be performed after any high temperature mass reflow or thermo-compression used in a die attach. In one or more embodiments, the optical source may be a laser device mounted on the substrate of the interposer. For more information on coupling an optical source to the substrate, see FIGS. 1, 2.1, 2.2 and 2.3 and the accompanying description.

In one or more embodiments, an optical receiver is attached to the substrate of the interposer. The optical receiver may be an optical receiver as described with respect to FIG. 1. Specifically, the optical receiver may be an optical fiber.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for providing optical connections, comprising:
    an integrated circuit, comprising an optical grating structure and an optical waveguide coupled to the optical grating structure;
    an interposer coupled to the integrated circuit, the interposer being a physical interface including a substrate separate from the integrated circuit, the substrate includes a plurality of electrical connections between electrical components, and the interposer is optically-transparent; and
    a laser device configured to generate a laser beam emission into the interposer,
    wherein the interposer is configured for transmission, through the interposer, of an optical wave the laser beam emission to the optical grating structure, wherein the interposer is configured for beam expansion of the optical wave during the transmission, through the interposer, and
    wherein the optical grating structure is configured to transform the optical wave with a predetermined electromagnetic propagation mode in the optical waveguide.

2. The system of claim 1, wherein the substrate is configured for producing an approximately straight path for the laser beam emission between the laser device and the optical grating structure.

3. The system of claim 1, wherein the optical grating structure comprises a plurality of diffraction grooves.

4. The system of claim 1, wherein the optical grating structure is configured to transform the laser beam emission into a planar waveform inside the integrated circuit.

5. The system of claim 1, wherein the substrate comprises a material that produces optical transparency in a predetermined wavelength regime of interest.

6. The system of claim 1, wherein the substrate is glass.

7. The system of claim 1, wherein the laser device is mounted to the interposer.

8. The system of claim 1, wherein the interposer is coupled with the integrated circuit through flip-chip bonding.

9. The system of claim 1, wherein the laser device comprises a laser array.

10. The system of claim 1, wherein the laser device comprises a vertical-cavity surface-emitting laser (VCSEL).

11. The system of claim 1, wherein the predetermined electromagnetic propagation mode is a transverse electric (TE) mode.

12. A system for providing optical connections, comprising:
    an integrated circuit, comprising an optical grating structure and an optical waveguide coupled to the optical grating structure;
    an interposer coupled to the integrated circuit, the interposer being a physical interface including a substrate separate from the integrated circuit, the substrate includes a plurality of electrical connections between electrical components, and the interposer is optically-transparent; and
    a beam turning device disposed inside the interposer,
    wherein the interposer is configured for transmission, through the interposer, of an optical wave from the beam turning device to the optical grating structure or from the optical grating structure to the beam turning device, wherein the interposer is configured for beam expansion of the optical wave during the transmission, through the interposer, and
    wherein the optical grating structure is configured to transform the optical wave into a predetermined electromagnetic propagation mode in the optical waveguide.

13. The system of claim 12, wherein the beam turning device comprises a turning mirror with a coated reflective surface configured to turn the optical wave a predetermined amount of degrees.

14. The system of claim 12, further comprising:
    one or more optical waveguides disposed inside the interposer and coupled to the beam turning device,
    wherein the one or more optical waveguides are configured for directing the optical wave through the interposer and to the beam turning device.

15. The system of claim 12, further comprising:
    a distributed feedback (DFB) laser coupled to the beam turning device,
    wherein the DFB laser comprises a gain section waveguide, one or more Bragg grating-based distributed feedback elements and one or more mirror reflectors, and
    wherein the DFB laser is configured to generate the optical wave.

16. The system of claim 12, wherein the substrate comprises a material that produces optical transparency in a predetermined wavelength regime of interest.

17. The system of claim 12, wherein the interposer is coupled with the integrated circuit through flip-chip bonding.

18. A method comprising:
    providing an integrated circuit, comprising an optical grating structure and an optical waveguide coupled to the optical grating structure;
    providing an interposer coupled to the integrated circuit, the interposer being a physical interface including a substrate separate from the integrated circuit, the substrate includes a plurality of electrical connections between electrical components, and the interposer is optically-transparent; and
    providing a laser device configured to generate a laser beam emission into the interposer,
    wherein the interposer is configured for transmission, through the interposer, of an optical wave the laser beam emission to the optical grating structure, wherein the interposer is configured for beam expansion of the optical wave during the transmission, through the interposer, and
    wherein the optical grating structure is configured to transform the optical wave with a predetermined electromagnetic propagation mode in the optical waveguide.

19. The method of claim 18, wherein the substrate is configured for producing an approximately straight path for the laser beam emission between the laser device and the optical grating structure.

20. The method of claim 18, wherein the optical grating structure comprises a plurality of diffraction grooves.

* * * * *